(12) United States Patent
Benzel et al.

(10) Patent No.: US 7,555,956 B2
(45) Date of Patent: Jul. 7, 2009

(54) MICROMECHANICAL DEVICE HAVING TWO SENSOR PATTERNS

(75) Inventors: Hubert Benzel, Pliezhausen (DE); Christoph Schelling, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 11/486,660

(22) Filed: Jul. 13, 2006

(65) Prior Publication Data
US 2007/0169558 A1 Jul. 26, 2007

(30) Foreign Application Priority Data
Jul. 13, 2005 (DE) .................. 10 2005 032 635

(51) Int. Cl.
*G01L 7/00* (2006.01)
*G01P 15/00* (2006.01)
(52) U.S. Cl. .................. 73/714; 73/514.33; 73/514.01; 73/754
(58) Field of Classification Search .................. None
See application file for complete search history.

(56) References Cited

U.S. PATENT DOCUMENTS

| 5,313,836 | A | | 5/1994 | Fujii et al. |
| 5,531,121 | A | * | 7/1996 | Sparks et al. .................. 73/716 |
| 6,178,820 | B1 | | 1/2001 | Kirjavainen et al. |
| 6,293,154 | B1 | | 9/2001 | Kurtz |
| 7,322,236 | B2 | * | 1/2008 | Combi et al. .................. 73/488 |
| 7,495,302 | B2 | * | 2/2009 | Fischer et al. ................ 257/419 |
| 2005/0172717 | A1 | * | 8/2005 | Wu et al. .................. 73/514.34 |
| 2007/0125161 | A1 | * | 6/2007 | Bryzek et al. .............. 73/146.4 |

FOREIGN PATENT DOCUMENTS

| DE | 4125467 | 2/1993 |
| DE | 4206174 | 9/1993 |
| DE | 4410794 | 10/1995 |
| DE | 19626083 | 1/1998 |
| DE | 100 32 579 | 1/2002 |
| DE | 103 23 559 | 12/2004 |
| EP | 1 561 724 | 8/2005 |
| FR | 2641612 | 7/1990 |

OTHER PUBLICATIONS

"constriction." Academic Press Dictionary of Science and Technology. 1992. CredoReference. May 20, 2008.*
"constriction." Webster's Third New International Dictionary, Unabridged. Merriam-Webster Inc., 1993.*

* cited by examiner

*Primary Examiner*—Lisa M Caputo
*Assistant Examiner*—Punam Patel
(74) *Attorney, Agent, or Firm*—Kenyon & Kenyon LLP

(57) ABSTRACT

A micromechanical device and a method for producing this device are provided, two sensor patterns being provided in the semiconductor material to record two mechanical variables, in particular the pressure and the acceleration. The functionality of both sensor patterns is based on the same predefined converter principle.

6 Claims, 7 Drawing Sheets ered manner, it is therefore necessary to provide up to four different chips for these applications, i.e.,

MICROMECHANICAL DEVICE HAVING TWO SENSOR PATTERNS

BACKGROUND INFORMATION

German Patent Application No. DE 103 23 559 describes a micromechanical device, in particular a pressure sensor, the functionality of the sensor pattern of the pressure sensor being based on a piezoresistive converter principle for converting a mechanical force into an electrical signal. It is disadvantageous that a plurality of sensors is required to measure several different mechanical variables, for instance to measure a pressure and an acceleration, the sensors furthermore generally being based on different converter principles and therefore unable to be represented on one chip in a monolithically integrated manner. Applications in which simultaneous recording of a plurality of different mechanical variables, in particular pressure and acceleration, is desirable, are found in the measurement of tire pressures or also in side impact sensing in the automotive field. When sensors that are based on different converter principles are used to measure these different mechanical variables, it is therefore necessary to provide up to four different chips for these applications, i.e., one chip in each case for the acceleration sensor (capacitive measurement, for instance) and the pressure sensor (piezoresistive measurement) as well as for a separate evaluation circuit for the acceleration sensor and the pressure sensor. However, such multi-chip applications are relatively cost-intensive, which is to be avoided according to the present invention.

SUMMARY OF THE INVENTION

The micromechanical device according to the present invention has the advantage of providing a first and a second sensor pattern on a shared semiconductor material in a monolithically integrated manner, which not only reduces the cost and the required space but also improves the functionality due to smaller connection paths, lower transition resistances, etc., and allows a more cost-effective overall solution through the use of the same converter principle, i.e., a piezoresistive converter principle, in particular, for both sensor patterns. It is also possible to monolithically integrate both sensor patterns with a single, two-channel evaluation circuit, so that the production expense for the micromechanical device is lower on the one hand, and the evaluation of the generated signals is improved on the other hand.

It is particularly advantageous that the converter principle is based on the piezo-sensitive effect, in particular the piezoresistive effect, in a plurality of sensor regions of the semiconductor material. In an especially advantageous manner this makes it possible to combine high sensitivity of the sensor patterns with a cost-effective production method of the micromechanical device. Furthermore, a converter principle on the basis of the piezoresistive effect is less susceptible to the problems caused by static charges, so that the device according to the present invention is able to be configured in a more fail-safe manner. In addition, it is preferred that the first sensor pattern has a first diaphragm introduced into the semiconductor material, and that the second sensor pattern has a second diaphragm introduced into the semiconductor material, each diaphragm preferably including at least one sensor region or being connected to at least one sensor region.

By the use of the diaphragms the present invention provides a simple and robust possibility for producing a pattern that is sensitive to a mechanical influence variable, so that sensor patterns that are especially robust and reliable are able to be produced on the basis of the piezoresistive converter principle. Furthermore, it is preferred if the first sensor pattern has a hermetically sealed first cavity underneath the first diaphragm and/or the second sensor pattern has a seismic mass connected to the second diaphragm, the seismic mass preferably being hermetically encapsulated and/or the second diaphragm being provided with support, in particular being supported by at least one lateral constriction. With relatively little effort and by using patterns that are producible in a robust manner, it is thus possible to realize a pressure sensor and a sensor which are sensitive to an inertial force, in particular an acceleration sensor for measuring a linear acceleration or for measuring an angular acceleration or a rate of rotation. Supporting the diaphragm prevents the sensor diaphragm from adhering to the underlying substrate when the cavity is produced inside which a vacuum exists at least in the meantime.

According to the present invention, it is especially advantageous that a circuit pattern of an electronic circuit for analyzing and/or processing signals emanating from the sensor patterns or being modified by the sensor patterns is introduced into the semiconductor material, the production of the circuit pattern preferably being at least partially provided simultaneously with the production of the sensor patterns. This makes it possible to produce a complete, combined sensor or a complete, combined sensor unit, which not only has the patterns that are sensitive to the mechanical variables to be measured, but which also implements preprocessing of the sensor signals, possibly even with a certain intelligence. Intelligent preprocessing in this context is understood to mean that a relation is already established between the signals emanating from the sensor patterns measuring the different mechanical variables, so that, for instance, implausible combinations of pressure and acceleration values are either not forwarded or their implausibility is at least indicated or signaled. According to the present invention, it is especially preferred that the diaphragms essentially include a monocrystalline material, preferably monocrystalline silicon. This allows an especially cost-effective production of piezo sensors that already respond to slight deflections of the diaphragm and thus operate with an especially high sensitivity.

In contrast to the related art, the method according to the present invention has the advantage that the diaphragms for the first sensor pattern and also for the second sensor pattern for the measurement of two different mechanical variables, especially pressure and linear acceleration, are produced simultaneously, so that the production of the device according to the present invention is able to be realized in an especially cost-effective manner. It is particularly advantageous that the seismic mass is made of substrate material, i.e., the semiconductor material. Furthermore, in the method according to the present invention it is preferred that a partial region of the semiconductor material is etched so as to become porous for the introduction of the diaphragms into the semiconductor material, preferably at a porosity of more than 50%, preferably more than 80%, and the first cavity and a second cavity are formed by relocating or etching out the semiconductor material in the partial region etched so as to become porous. According to the present invention, this advantageously makes it possible to produce the cavities without the introduction of accesses and without the use of undercut-type etching methods. Furthermore, according to the present invention it is advantageous that an etch barrier layer, preferably silicon oxide, is introduced into the second cavity in the region of the seismic mass to be formed, once the second cavity has been formed. The patterning of the seismic mass may thus be implemented in an especially precise manner from the rear of the semiconductor material, preferably utilizing a bulk-micromechanical processing sequence.

Another subject matter of the present invention is a combined acceleration and pressure sensor having a micromechanical device according to the present invention, the combined acceleration and pressure sensor having the advantage that, due to the use of the same—preferably a piezoresistive—converter principle for both sensings, a cost-effective overall solution through a single, two-channel evaluation ASIC is possible and, overall, either only two chips are required for the combined acceleration and pressure sensor, or a monolithic integration of the two sensor patterns together with the evaluation circuit is even possible. Furthermore, using the acceleration and pressure sensor according to the present invention, the detection of different components of the linear acceleration or the angular acceleration is possible, for instance the detection of a linear acceleration perpendicular to the substrate plane of the device, or an angular acceleration parallel to the substrate plane of the device. The substrate plane corresponds to the plane of the largest extension of the semiconductor material.

DETAILED DESCRIPTION

Figure 1:
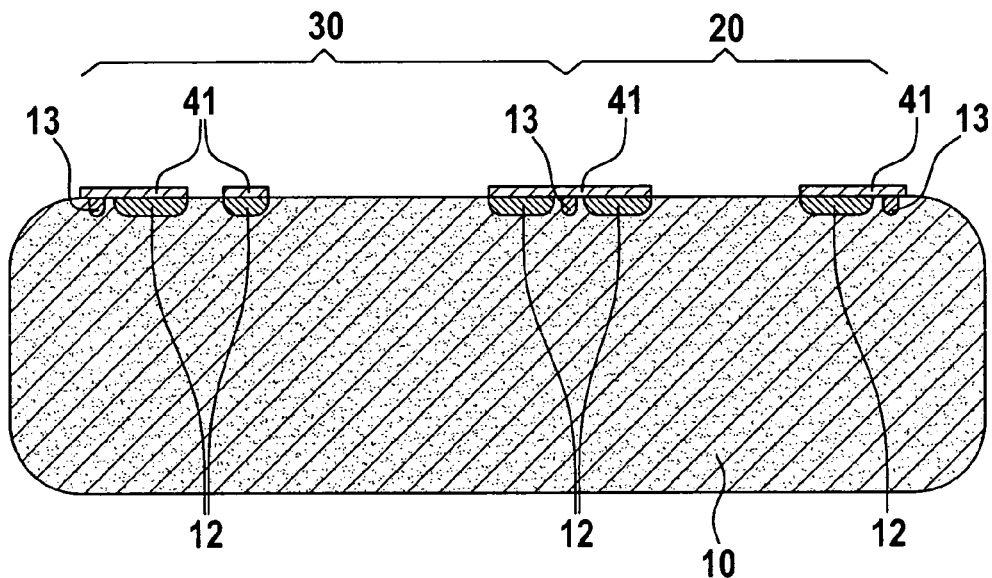
FIGS. 1 through 8 show a first processing sequence for producing a micromechanical device according to the present invention, and an illustration of a method according to the present invention for producing the device.
Figure 2:
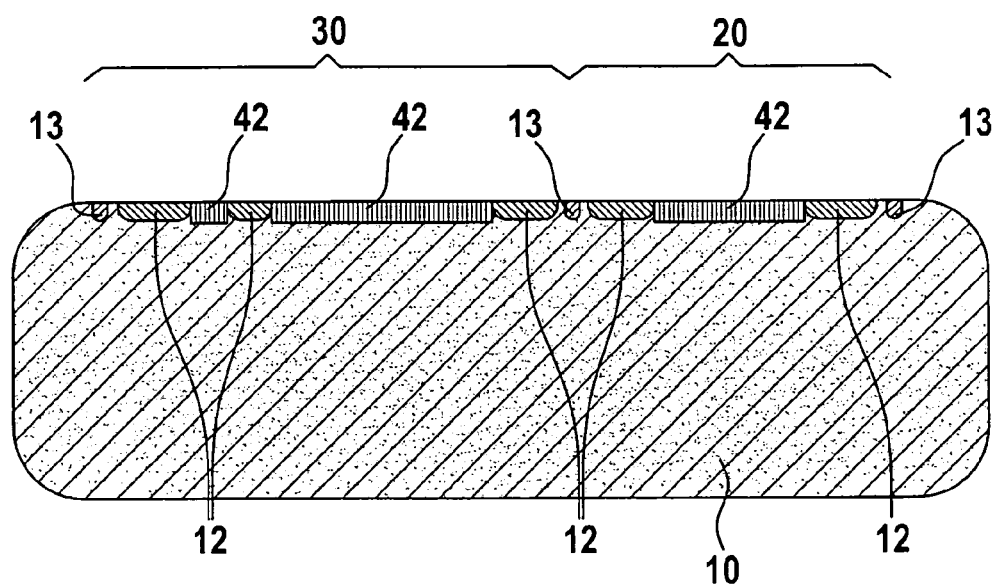

FIG. 1 shows a first preliminary pattern for a micromechanical device according to the present invention. Various doping regions 12 are introduced into a semiconductor material 10, which is provided as silicon wafer, in particular. According to the present invention, semiconductor material 10 is a p-substrate, for instance, and the introduced dopings 12 are relatively heavily negatively doped doping regions. Additional doping regions are likewise introduced into semiconductor material 10 as so called first well doping regions 13 and provide electrical insulation between different regions or patterns of semiconductor material 10. For instance, a first region 20 and a second region 30 are already discernable in FIG. 1 in which a first sensor pattern 20 and a second sensor pattern 30, respectively, will be realized in the finished micromechanical device according to the present invention, as will result from the description of the following figures. In a subsequent step, masks 41, which are used to delimit from so-called anodizing regions, are deposited onto semiconductor material 10 with its dopings 12 and 13. In FIG. 2, an additional precursor pattern of the device according to the present invention is shown, identical reference numerals from FIG. 1 once again denoting the same parts or regions of the device or the semiconductor material. The same applies to the following figures where the same reference numerals again denote the same components or regions of the device. The regions that are not covered by anodizing mask 41 in FIG. 1 are etched so as to be porous, using an anodizing method, which is denoted in FIG. 2 by reference numeral 42.

Figure 3:
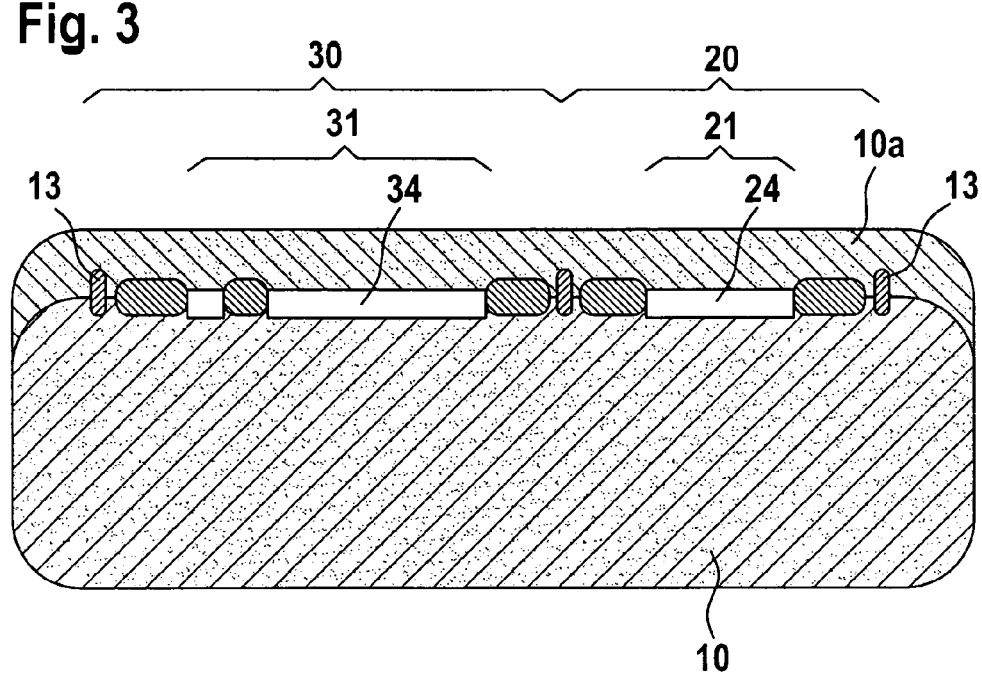
Figure 4:
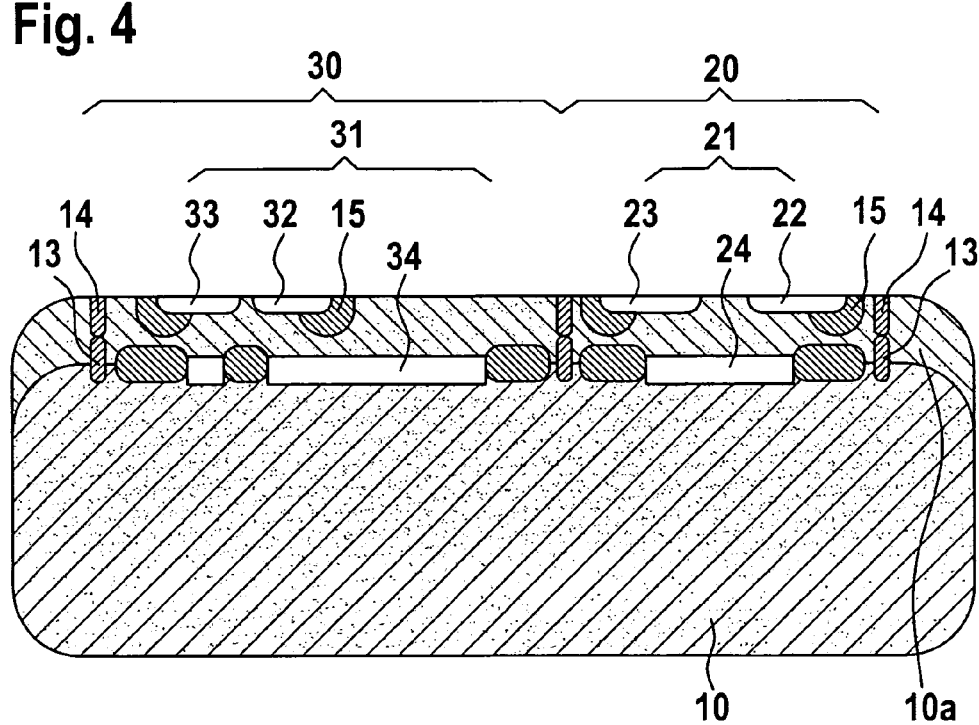

FIG. 3 shows a further pre-stage of the device according to the present invention, anodized regions 42 of FIG. 2 being covered by a preferably monocrystalline epitaxy layer 10a. This epitaxy layer 10a serves as a diaphragm above regions 42 from FIG. 2. In the region of first sensor pattern 20 epitaxy layer 10a forms a first diaphragm 21, and in the region of second sensor pattern 30 epitaxy layer 10a forms a second diaphragm. After deposition of the epitaxy layer, a relocation of the semiconductor material in porous regions 42 is brought about by a thermal treatment, a first cavity 24 and a second cavity 34 forming in the process. Diaphragms 21, 31 are situated above cavities 24, 34, respectively. Both the production of porous silicon regions 42 from FIG. 2 and the production of cavities 24, 34 are implemented according to a method indicated in German Patent Application No. DE 100 32 579. This printed publication is expressly incorporated by reference herein, with respect to the method for anodizing, i.e., for producing porous regions in semiconductor material 10 and for depositing a preferably monocrystalline epitaxy layer 10a and for creating cavities 24, 34. In FIG. 3 and in the additional figures, doping regions 12 in semiconductor material 10 are no longer separately indicated by reference numerals. FIG. 4 shows a further precursor pattern of the device according to the present invention in which additional diffused regions 15 are introduced into epitaxy layer 10a and, furthermore, the actual sensor regions 22, 23, 32, 33 as well. According to the present invention, these sensor regions are realized in such types of materials that cause a large piezoresistive effect at a given material tension. Sensor regions 22, 23, 32, 33 are preferably located at locations of diaphragm 21, 31 that exhibit large mechanical tensions in response to deformation of the diaphragm. A first and second sensor region 22, 23 are part of first sensor pattern 20, and a third and fourth sensor region 32, 33 are part of second sensor pattern 30. Diffused regions 15 are used as low-resistance supply lines to sensor regions 22, 23, 32, 33.

Figure 5:
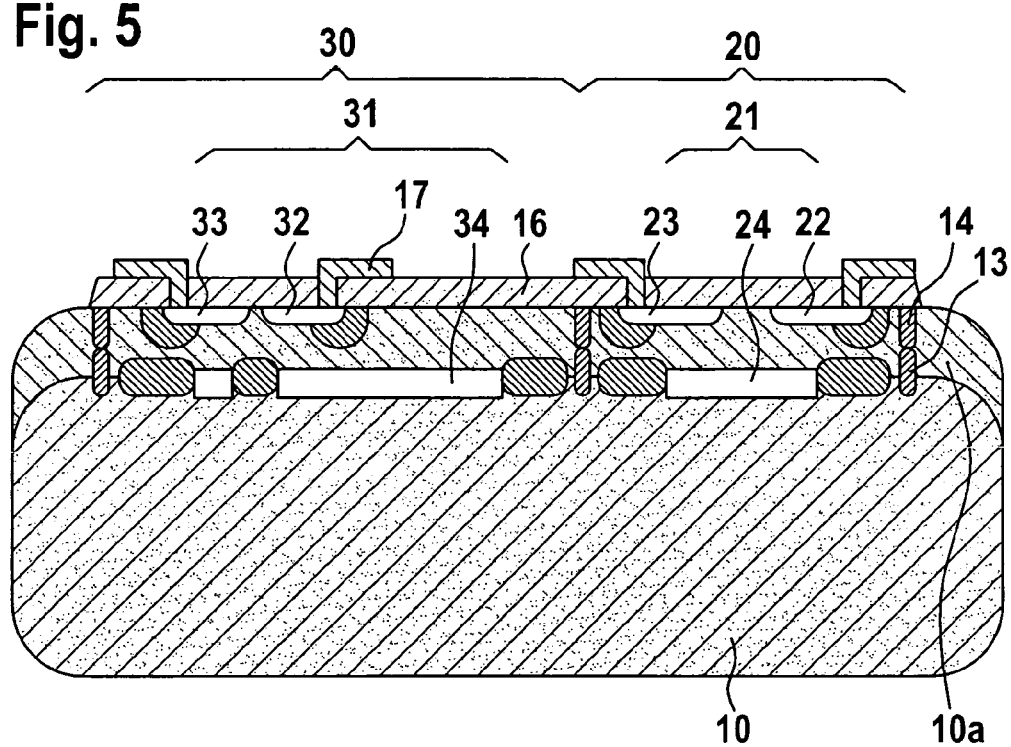

FIG. 5 shows a further precursor pattern of the device according to the present invention in which a passivation layer 16 and metallic connectors 17 are deposited on epitaxy layer 10a. Metallic connectors 17 are designed to be temperature-stable, in particular.

Figure 6:
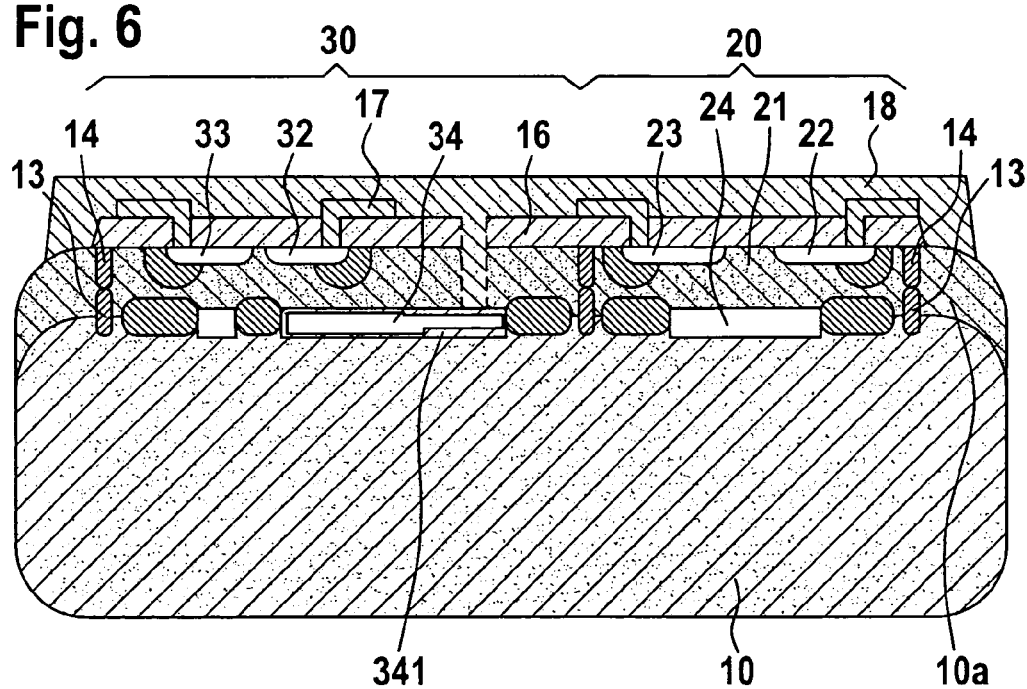
Figure 7:
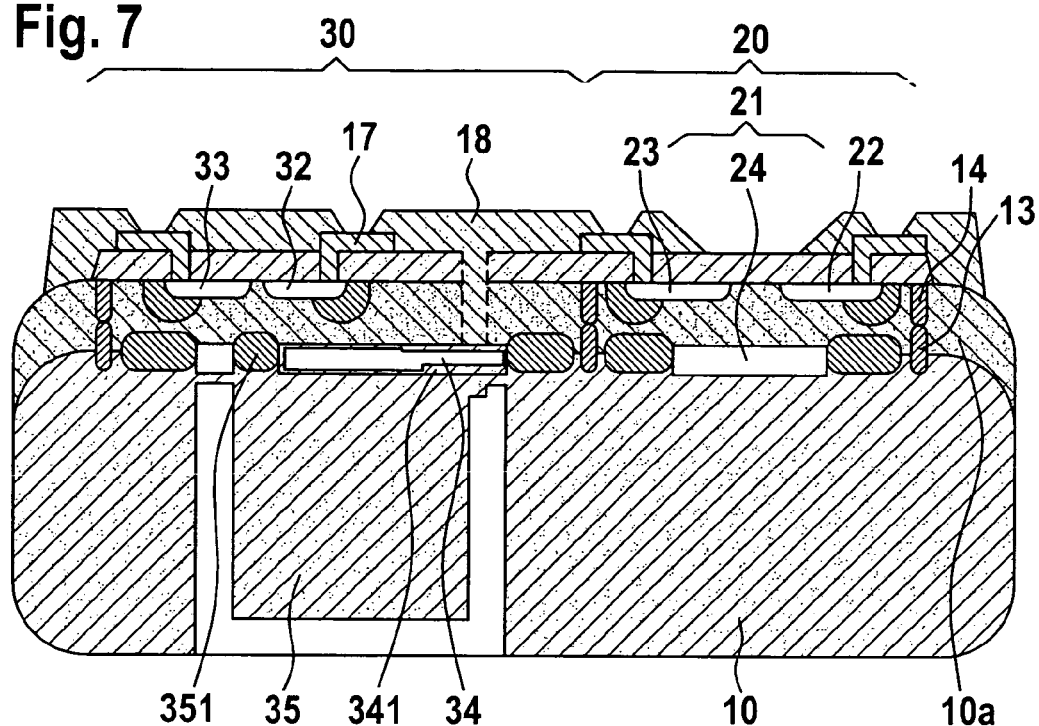

FIG. 6 shows an additional precursor pattern of the device according to the present invention; according to FIG. 5, an access region 36 to second cavity 34 is introduced into the precursor pattern and a sealing layer 18 is then applied on top of the pattern, the sealing layer forming an etch barrier layer 341 in second cavity 34 in the region of the seismic mass to be patterned later, and sealing access region 36 to second cavity 34. Sealing layer 18 is, for example, an oxidic sealing layer such as TEOS, in particular silicon oxide. Furthermore, access opening 36 to second cavity 34 is produced with the aid of a trenching process, in particular. FIG. 7 shows another precursor pattern of a device according to the present invention in which an at least partial exposing of metallized connectors 17 is effected on the front side of the pattern, i.e., in the upper region in FIG. 7, and the patterning of seismic mass 35 is implemented from the rear of semiconductor material 10, in particular by trench etching. This etch process for the patterning of seismic mass 35 is stopped at etch barrier layer 341. In another etching step, etch barrier layer 341 is then removed and seismic mass 35 thus exposed at its suspension point 351 on second diaphragm 31.

The removal of oxidic etch barrier layer 341 may be implemented with the aid of HF vapor etching, in particular.

Figure 8:
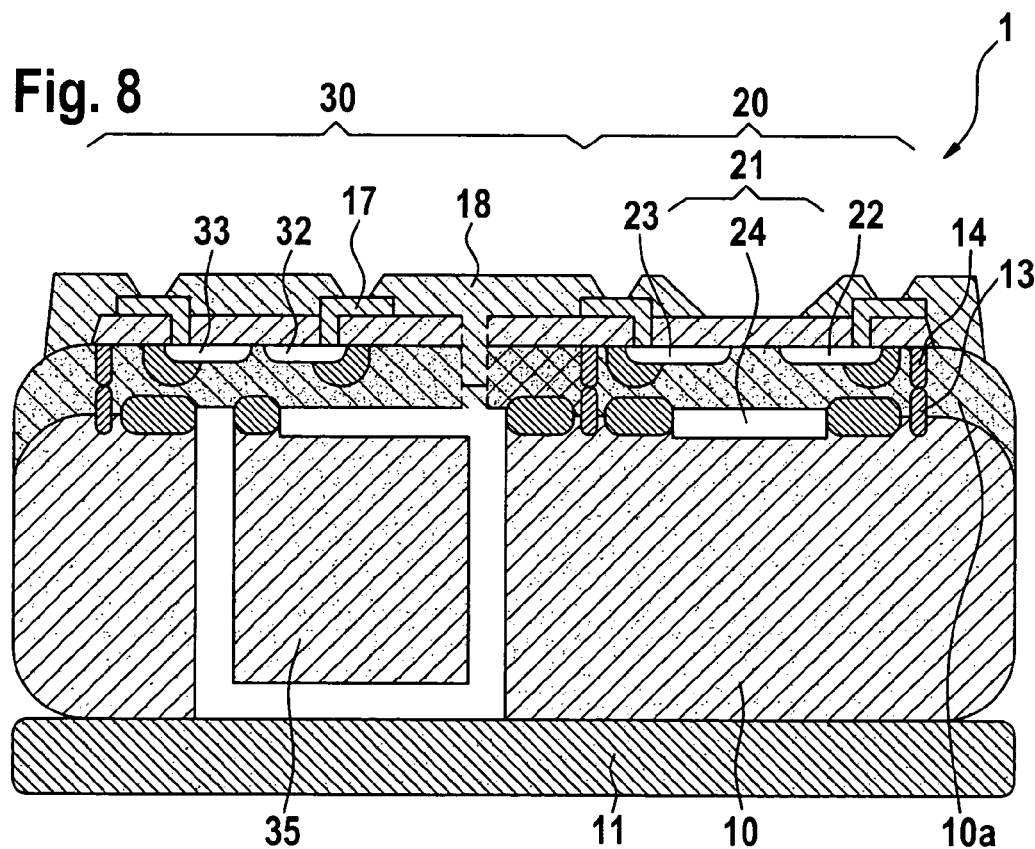

In FIG. 8, finished micromechanical device 1 is illustrated; a second substrate material 11 being applied to the rear side of semiconductor material 10 to protect the seismic mass.

Figure 9:
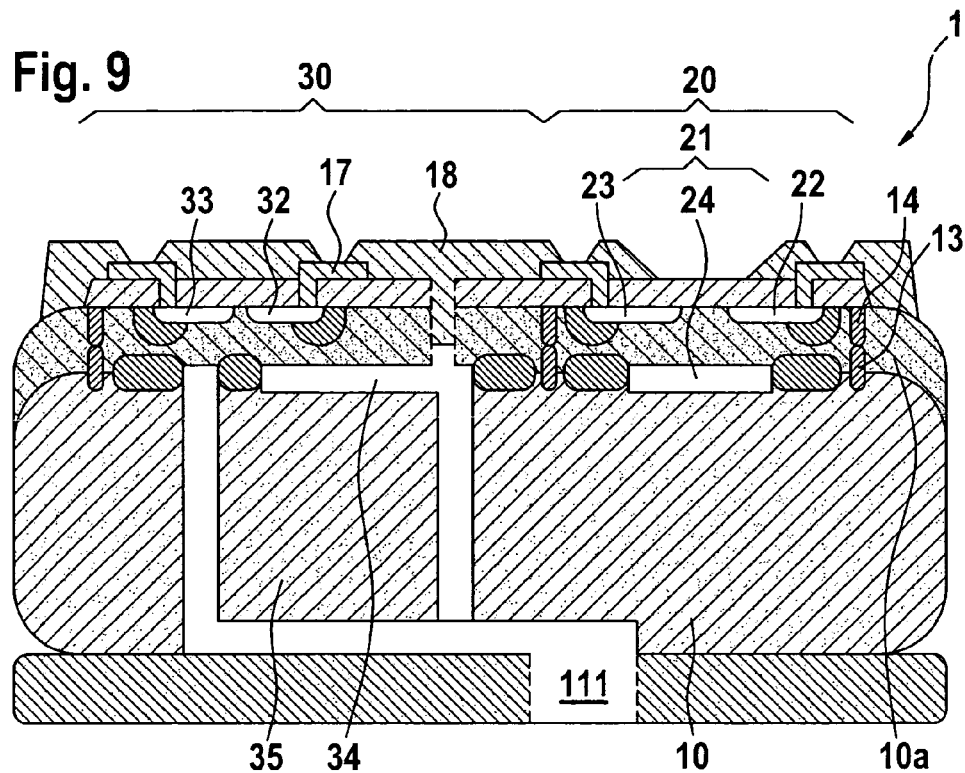
FIG. 9 shows an alternative embodiment of the micromechanical device, produced with the aid of the first processing sequence.

FIG. 9 shows a second specific embodiment of micromechanical device 1 according to the present invention, second cavity 34 being open from the rear via an opening 111, i.e., from the direction of additional substrate material 11.

Figure 10:
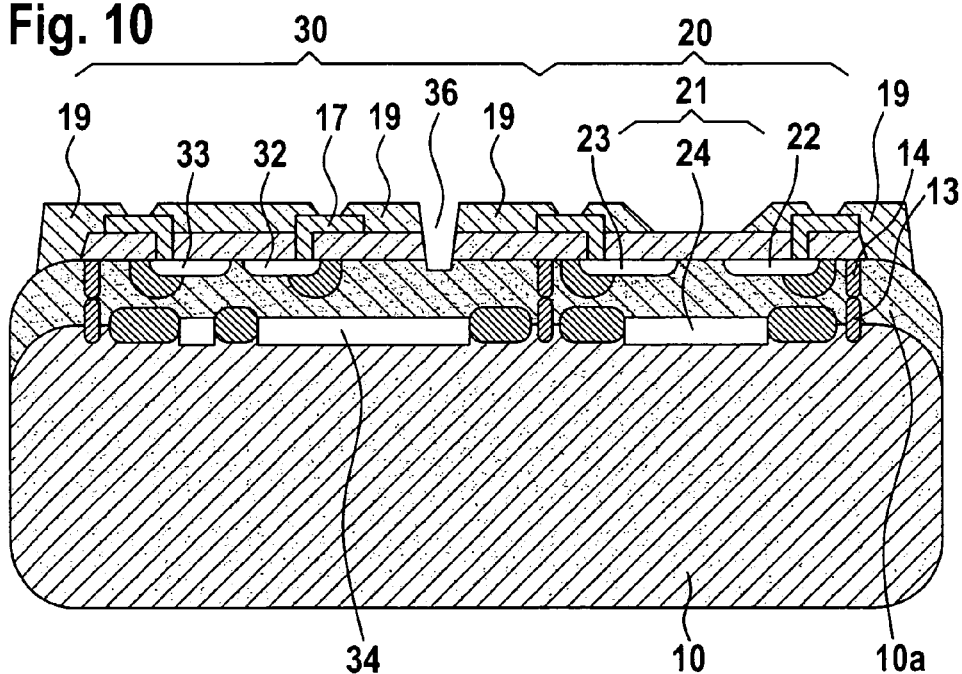
FIGS. 10 through 13 show a second processing sequence for the production of a micromechanical device according to the present invention.
Figure 11:
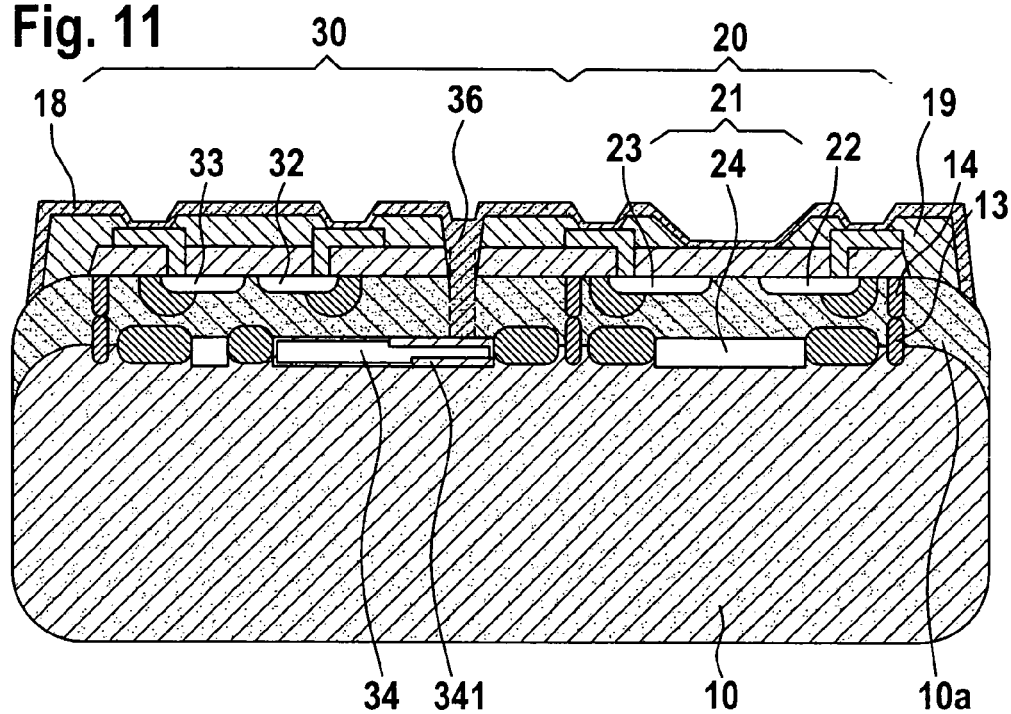
Figure 12:
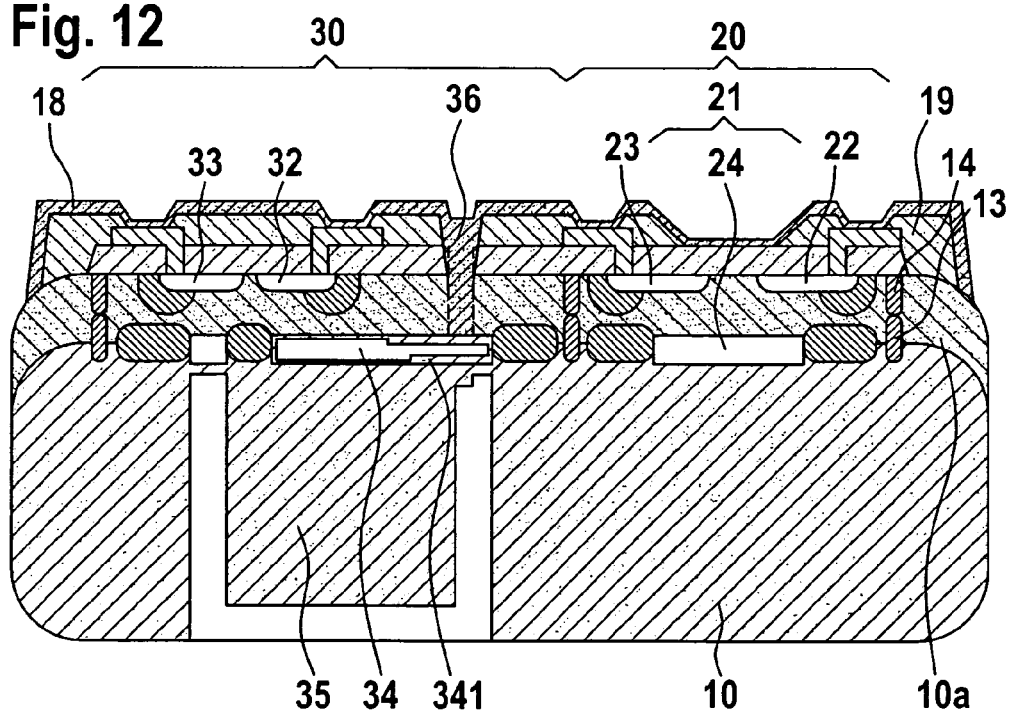
Figure 13:
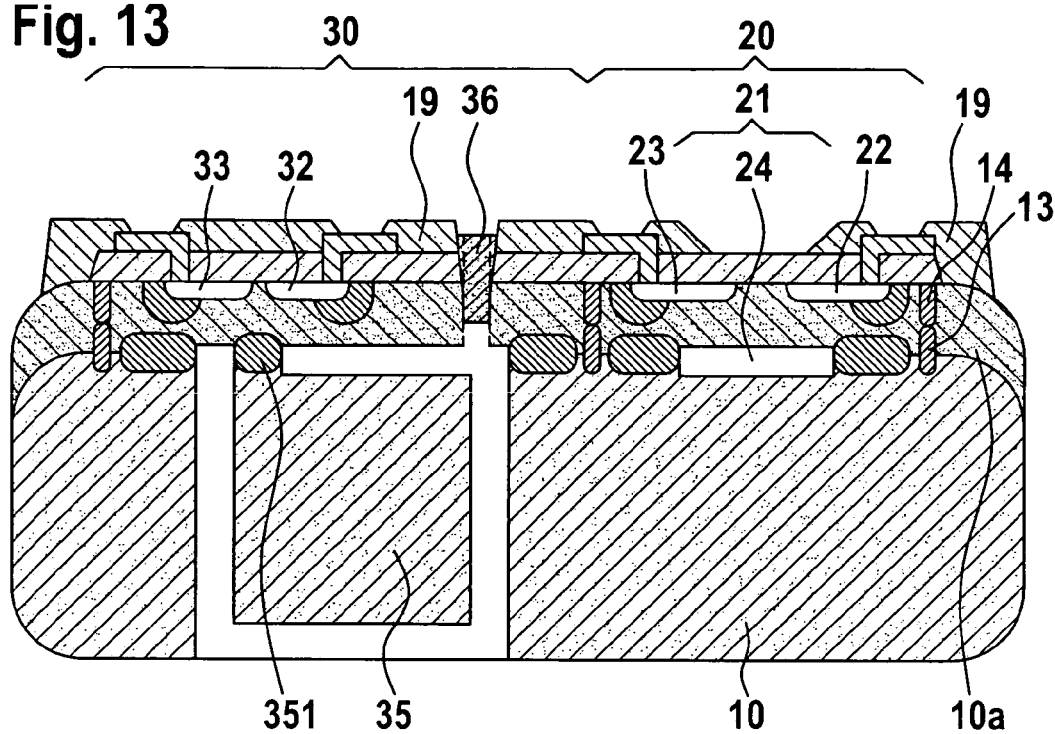

FIG. 10 shows a precursor pattern of an alternative production process for producing a micromechanical device 1 according to the present invention. The steps of FIGS. 1 through 6 are the same in the alternative production process, but the deposition of a passivation layer 19, in particular in the form of a nitride such as silicon nitride, takes place before access region 36 to second cavity 34 is introduced and etch barrier layer 341 is deposited. Subsequently, access region 36 to second cavity 34 is produced in this specific embodiment as well, in particular by trench etching, this access region 36 then being sealed again, cf. FIG. 11, by sealing layer 18, in particular silicon oxide, so as to form etch barrier layer 341, which is shown in FIG. 11. FIG. 12 shows another precursor pattern of the device according to the present invention. Compared to the illustration of FIG. 11, seismic mass 35 was once again exposed from the rear of the semiconductor material. FIG. 13 shows another precursor pattern of the device according to the present invention, seismic mass 35 being completely exposed and joined to second diaphragm 31 only by its connection point 351. This exposing of seismic mass 35 is achieved by etch barrier layer 341 being etched off (cf. FIG. 12), for instance by a selective wet process using AMS5. In the process, only the oxide is etched but not the nitride, the silicon or the metal. As a result, oxide layer 18 (also cf. FIG. 12) is likewise essentially etched off on the top surface of the device (possibly with the exception of the region of access opening 36 to second cavity 34), so that only passivation layer 19 or nitride layer 19 remains.

Figure 14:
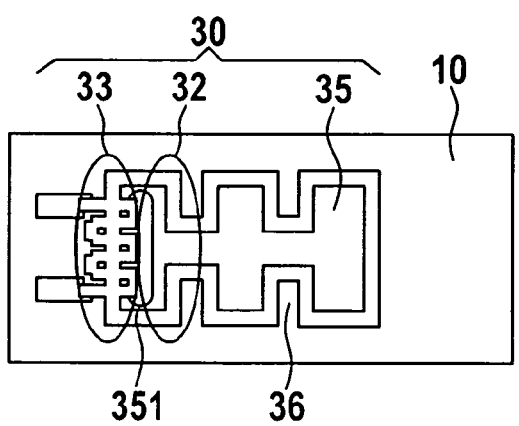
FIGS. 14 and 15 show two alternative embodiments of the seismic mass.
Figure 15:
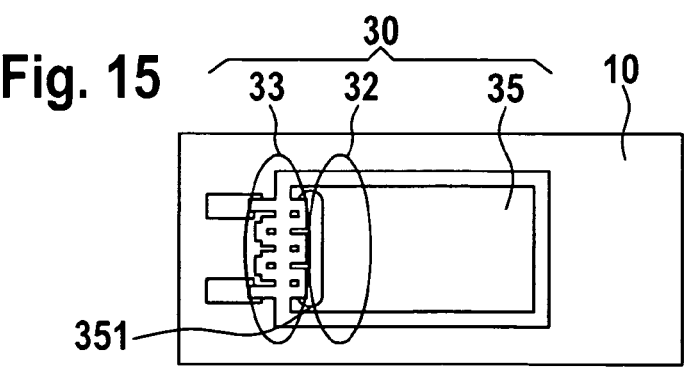

FIGS. 14 and 15 show views from below, i.e., from the direction of the rear of semiconductor material 10 toward seismic mass 35. To be seen, for one, is the region of suspension 351 of seismic mass 35 on second diaphragm 31 and also the regions of sensor elements 32, 33 on the front side of the device. By providing constrictions 36 in the production of second membrane 31, i.e., regions in which no anodization takes place and thus no cavity is produced, second diaphragm 31 is supportable in these locations, so that it will not bend downward and reach the undersurface of second cavity 34 due to the creation of the vacuum produced in the unopened second cavity 34. This may lead to second diaphragm 31 adhering to its subsurface and the device then no longer being usable.

What is claimed is:

1. A micromechanical device comprising:
    a semiconductor material, the semiconductor material including a first sensor pattern, the first sensor pattern being for detecting a first mechanical variable, a functionality of the first sensor pattern being based on a predefined converter principle, the semiconductor material further including a second sensor pattern, the second sensor pattern being for detecting a second mechanical variable, a functionality of the second sensor pattern being based on the predefined converter principle;
    wherein the first sensor pattern has a first diaphragm introduced into the semiconductor material, and the second sensor pattern has a second diaphragm introduced into the semiconductor material, each diaphragm one of (a) including and (b) being connected to at least one sensor region;
    wherein the first sensor pattern has a hermetically sealed first cavity underneath the first diaphragm, and wherein the second diaphragm is provided with support, with the aid of at least one sealed lateral constriction.

2. The device according to claim 1, wherein the first mechanical variable is a pressure.

3. The device according to claim 1, wherein the second mechanical variable is an acceleration.

4. The device according to claim 1, wherein the converter principle is based on a piezoresistive effect in a plurality of sensor regions of the semiconductor material.

5. The device according to claim 1, wherein the diaphragms include monocrystalline silicon.

6. An acceleration and pressure sensor comprising a micromechanical device for detecting at least one of (a) a component of a linear acceleration perpendicular to a substrate plane of the device and (b) a component of an angular acceleration parallel to the substrate plane of the device, the device including:
    a semiconductor material, the semiconductor material including a first sensor pattern, the first sensor pattern being for detecting a first mechanical variable, a functionality of the first sensor pattern being based on a predefined converter principle, the semiconductor material further including a second sensor pattern, the second sensor pattern being for detecting a second mechanical variable, a functionality of the second sensor pattern being based on the predefined converter principle;
    wherein the first sensor pattern has a first diaphragm introduced into the semiconductor material, and the second sensor pattern has a second diaphragm introduced into the semiconductor material, each diaphragm one of (a) including and (b) being connected to at least one sensor region;
    wherein the first sensor pattern has a hermetically sealed first cavity underneath the first diaphragm, and wherein the second diaphragm is provided with support, with the aid of at least one sealed lateral constriction.

* * * * *